United States Patent

David et al.

Patent Number: 5,539,453
Date of Patent: Jul. 23, 1996

[54] PHOTOGRAPHIC SELF-PORTRAIT INSTALLATIONS

[75] Inventors: Dan David, Rome, Italy; Yehuda Hecht, Hove, England

[73] Assignee: PMI Photomagic Ltd., United Kingdom

[21] Appl. No.: 211,270

[22] PCT Filed: Sep. 14, 1992

[86] PCT No.: PCT/GB92/01679

§ 371 Date: Jul. 11, 1994

§ 102(e) Date: Jul. 11, 1994

[87] PCT Pub. No.: WO93/07710

PCT Pub. Date: Apr. 15, 1993

[30] Foreign Application Priority Data

Sep. 28, 1991 [GB] United Kingdom .................. 9120667
Mar. 23, 1992 [GB] United Kingdom .................. 9206295

[51] Int. Cl.$^6$ ..................................... H04N 7/18
[52] U.S. Cl. ........................... 348/77; 348/158,211
[58] Field of Search .................. 358/77, 61, 211, 358/158; H04N 7/18

[56] References Cited

U.S. PATENT DOCUMENTS

| | | | |
|---|---|---|---|
| 4,530,009 | 7/1985 | Mizokawa | 348/589 |
| 4,789,907 | 12/1988 | Fischetti | 358/335 |
| 5,072,246 | 10/1991 | Thayer | 348/335 |

FOREIGN PATENT DOCUMENTS

| | | |
|---|---|---|
| 0326515 | 2/1989 | European Pat. Off. . |
| 3018722 | 11/1981 | Germany . |
| 2235347 | 2/1991 | United Kingdom . |
| 2242592 | 2/1991 | United Kingdom . |
| 91/15082 | 10/1991 | WIPO . |

*Primary Examiner*—Howard W. Britton
*Attorney, Agent, or Firm*—Lucas & Just

[57] ABSTRACT

A photographic self-portrait installation includes a photo-video installation (1) which includes a video camera (2) for viewing a subject and a monitor (10) on which the subject may view a real time self image in background against a foreground of a selection of computer-digitised foreground images. The subject is able to freeze a real time self image against a personally preselected foreground image and generate a composite for printing. The installation may be open or housed within a booth.

30 Claims, 6 Drawing Sheets

PHOTOGRAPHIC SELF-PORTRAIT INSTALLATIONS

This invention concerns improvements in or relating to photographic self-portrait installations and in particular has reference in one aspect to a video-photo installation for the production of personalised photographs composited with an accompanying image selected by the user of the installation.

In another aspect the invention relates to a photographic self-portrait installation including a video-photo installation integrated with a wet photographic system allowing the user a choice of the type of photograph to be produced.

It is already known to provide a video-photo installation capable of generating such composite photographs wherein the user selects a background from a memory bank in which a plurality of images is stored and one of the images is retrievable upon command. Such an installation includes a control panel with appropriate command buttons actuable by the user for choosing a background from a range of static reproductions thereof sited adjacent the buttons, and for displaying the chosen background on a monitor. A video camera is provided for viewing the subject user, and in known installations the subject has to adopt a set pose before the camera automatically freezes the final image for superimposition on the selected background for subsequent printing. A disadvantage of the prior art installation is the relatively low degree of control afforded to the user in terms of both viewing the backgrounds and more particularly managing the final image to be captured for photographic reproduction.

It has also long been known to provide an installation, usually coin-operated, for a user to take a self portrait employing a conventional photographic camera within a booth, the camera taking a number of shots of one or more poses, the resulting exposed film being processed by conventional wet techniques.

It is also known from U.S. Pat. No. 5,072,246 to provide in one self photography booth in combination a video camera and a conventional photographic camera, the video camera being used to assist the user to reach a desired pose before a self portrait is taken using the photographic camera.

One object of the invention is therefore to provide an improved photographic self-portrait installation including a video-photo installation which allows the user a greater degree of control over its operation than has hitherto been possible with the prior art proposals.

A further object of the invention is to provide an improved photographic self-portrait installation incorporating an integrated video-photo installation and a self-photography installation using a wet photographic printing process.

According to a first aspect of the invention there is provided a photographic self-portrait installation comprising a video-photo installation including a video camera for viewing a subject user, a first monitor for reproducing a real time image of the user as a background on the monitor screen, a computer for controlling the operation of the installation, a memory store of preselected computer-digitised images, means for storing a frozen real time image, interface means for interfacing the memory store with the real time image for display on the first monitor and/or for interfacing with the frozen real time image, means for creating a frozen real time image, means for selecting a computer-digitised image, a second monitor for displaying a composite of a user-created frozen real time image as a background and at least one user-selected computer-digitised image from the memory store as a foreground, and a printer for printing the said composite upon user command.

Advantageously a video enhancer is employed between the video camera and the interface means to enhance the colour and lighting characteristics.

The camera may conveniently be orientable by suitable actuation means provided for the user; such means may be manual in the form of a single lever or joy stick, or may be electrically controlled with motors arranged to change the position of the camera.

Conveniently, the computer is so programmed that the memory store of computer-digitised images may be continuously and sequentially displayed as a superimposed foreground on the real time image of the subject user, the interface means effective the composite. The continuous display of the computer-digitised images can be stopped with a command from the user at the selected choice. In the alternative, the store of computer-digitised images may be displayed in montage form.

A frozen real time image of the user is created at the instigation of the user upon actuation of the means provided for that purpose on the computer, the frozen image being reproduced on the second monitor as a background with the selected choice of the computer-digitised image as a foreground.

Preferably means are provided to give the subject user a visual indication of when the image is to be frozen. For example such means may be the discharge of a flashlight. In one alternative, a numerical countdown projected onto one of the monitors may be provided. In another alternative, the visual indication may be provided by a reducing column of light, for example red light.

A third monitor may be provided adjacent the camera, the monitor giving a mirror image of the background and the foreground, but showing the montage in real time.

The memory of computer-digitised images may comprise a variety of foreground images which may be of personalities, places, post cards, greeting cards, or identity cards, but the invention is not confined to such images.

The installation includes appropriate illumination for the operation thereof which is preselected dependent upon the location of the installation.

The photographic self portrait installation may advantageously be housed in a booth in which the user can be seated for the video-photo session. In the alternative, the installation may be open thereby allowing the photographic session to be conducted publicly. In this instance, the subject user can and usually will assume a standing position. In this alternative, open installation, provision may be made for a remote link with an operator who would be able to view the subject user on an appropriate monitor connected to the camera on the machine. The remote link would be provided with a microphone and the installation would have a loudspeaker mounted thereon inter alia for that purpose. In use, upon viewing a potential customer, the operator would speak to the customer for the purpose of encouraging use of the installation.

The printing operation of the installation is initiated in a commercial application by the insertion of appropriate currency or by the use of a card.

It is to be understood that the term printing in relation to the video-photo installation as used herein includes not only a visual print but also a software print such for example as on a diskette or any equivalent thereof. In particular it is envisaged that a diskette could be produced for the user to take away for loading onto a home personal computer to provide a local record of the self-photograph.

The invention also includes the production of such a diskette carrying a portrait of the user alone or in combination with a background or a foreground.

According to a second aspect of the invention there is provided a photographic self portrait installation comprising a video-photo installation including a video camera for viewing a subject user, a monitor screen for reproducing a real time image of the user as a background on the monitor screen, a computer for controlling the operation of the video-photo installation, a memory store of preselected computer-digitised images, means for storing a frozen real time image, interface means for interfacing the memory store with the real time image for display on the monitor screen and/or for interfacing with the frozen real time image, means for creating a frozen real time image, means for selecting a computer-digitised image, the monitor displaying a composite of a user-created frozen real time image as a background and at least one user-selected computer-digitised image from the memory store as a foreground, a first printer for printing the said composite upon user command, and including a self-photography installation adapted to utilize the said video camera for taking self portraits of a user, and a second printer employing a wet photographic process, and selector means for selecting the video-photo installation or the self-photography installation to produce the required self portrait.

The video-photo installation of the second aspect may be essentially the same as that of the first aspect save that only one monitor screen is provided although a second monitor screen may be provided to replicate the images produced on the first screen.

Conveniently, the video camera in the second aspect is disposed adjacent the monitor which may be of the liquid crystal type. The monitor screen may advantageously be orientated in a horizontal plane downwardly to project any image thereon onto a mirror suitably angularly orientated to give a reflected image to a user placed in front of the camera. The purpose of such an arrangement is to provide the user with a proper mirror image whereby any movements are replicated, in the same direction, thereby to allow the user the ability to adopt a desired pose more readily than if the projected image were reversed.

The second printer employs a conventional wet photographic development process which produces prints within a limited time space.

Conveniently the photographic self portrait installation of the second aspect is housed in a single booth, with the selector means provided in a suitable manner therewithin, a seat being provided for the user to pose in front of the camera.

Conveniently the installations of the present invention provide the subject user with instructions on their use either visually and/or audibly. Where audible instructions are to be given, a loudspeaker is provided at least for that purpose.

By way of example only, three embodiments of photographic self portrait installations according to the present invention are described below with reference to the accompanying drawings in which.

Figure 1:
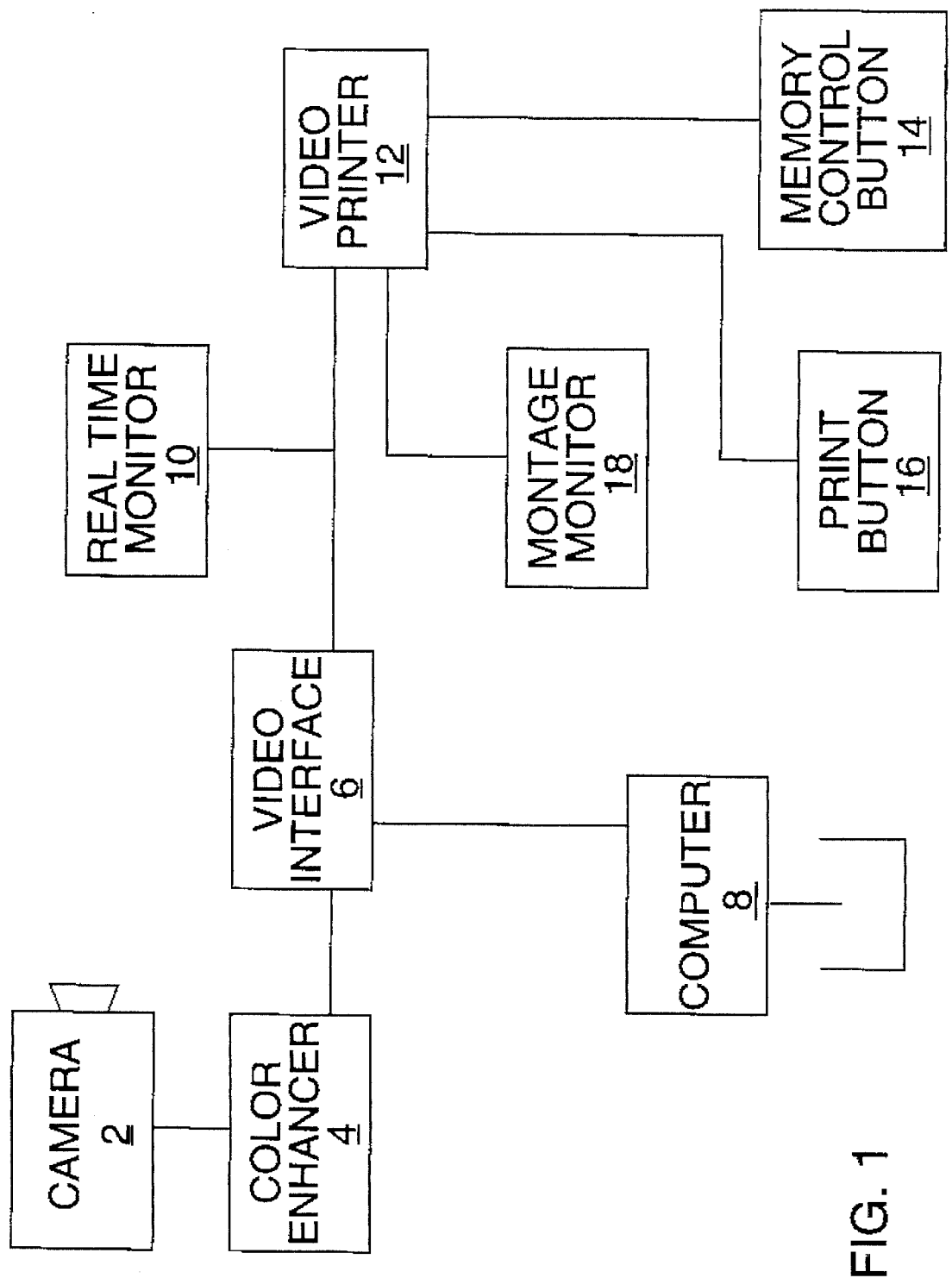
FIG. 1 is a block diagram thereof of a first embodiment.

Referring to FIG. 1 of the drawings, a video-photo installation 1 includes a video camera 2 coupled to a video image colour-enhancer 4 which is connected to a video interface 6.

A computer 8 is connected into the interface 6 which also interfaces with a first, real time, monitor 10 and a video printer 12 provided with a memory control button 14 and a print actuation button 16. A memory store (not shown) of a plurality of computer-digitised images is held within the computer which has a keyboard (not shown) provided with control keys for setting or releasing the digitised image displayed on the monitor 10.

A second monitor 18 is connected to the printer 12 and is adapted upon actuation of the memory button 14 to display a montage as hereinafter described.

in operation of the installation 1, a subject user is disposed in the range of the video camera 2 which sends the real time image it captures to the monitor 10 via the interface for display as the background on the monitor screen. Simultaneously, the computer-digitised images are continuously and sequentially displayed as a superimposed foreground alongside the real time image to provide a montage for viewing and consideration by the user.

The user is free to select a digitised image from the range being displayed, the selection then being set. The user may then adopt a pose which can be viewed in real time on monitor 10 as a background to the selected image and which upon actuation of the memory button 14 can be displayed as a frozen montage on the monitor 18. If the frozen montage is acceptable to the user, the print button 16 may be depressed and a print of the montage shown on monitor 18 is produced on appropriate paper which may be in the form of a postcard or greetings card or plain photographic paper. If, however, the frozen montage is unacceptable, it can be released and the user can reselect a montage of acceptable form for subsequent printing.

Figure 2:
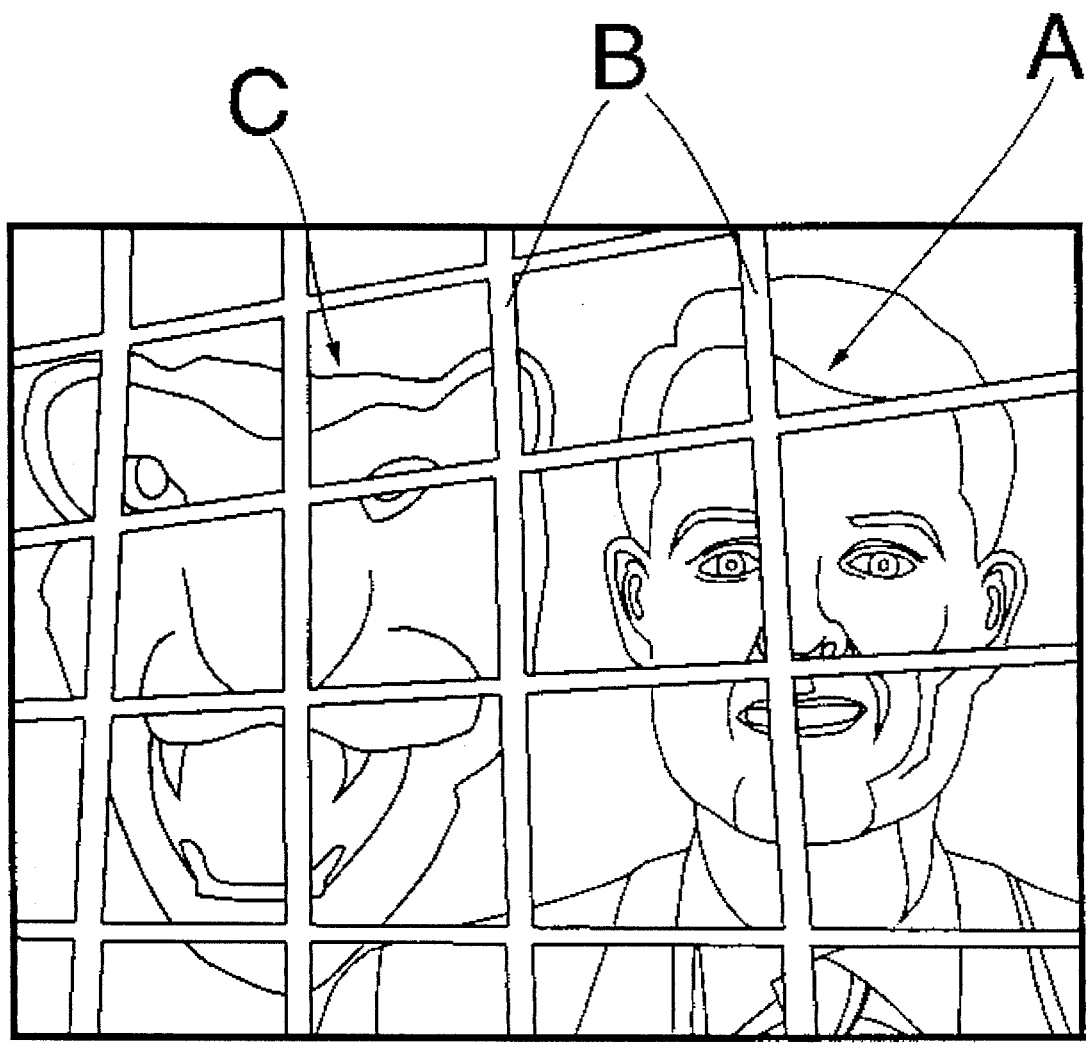
FIG. 2 is a drawing of a photograph produced by the first embodiment.

FIG. 2 shows a drawing of a photograph as printed by the installation described in relation to FIG. 1, the user A being depicted behind the bars B of a cage housing a tiger C. It will be readily appreciated that the invention allows the production of such a 'fun' photograph since the real time image A is in the background, whilst the bars B and the tiger C are in the foreground. Known installations are incapable of producing such a composite picture.

In commercial application of the installation, the requisite cost for the print may be paid either at the commencement of the operation or once the user has indicated acceptability of the frozen montage.

Appropriate instructions either in static print on the installation will be provided or on one of the monitor screens.

The first aspect of the present invention thus provides a video-photo installation which gives the user versatile control over its operation and the resultant print, the user being able to select and reselect the real time image to be recorded and to select and reselect the digitised image prior to the ultimate decision to print the resulting montage.

Figure 3:
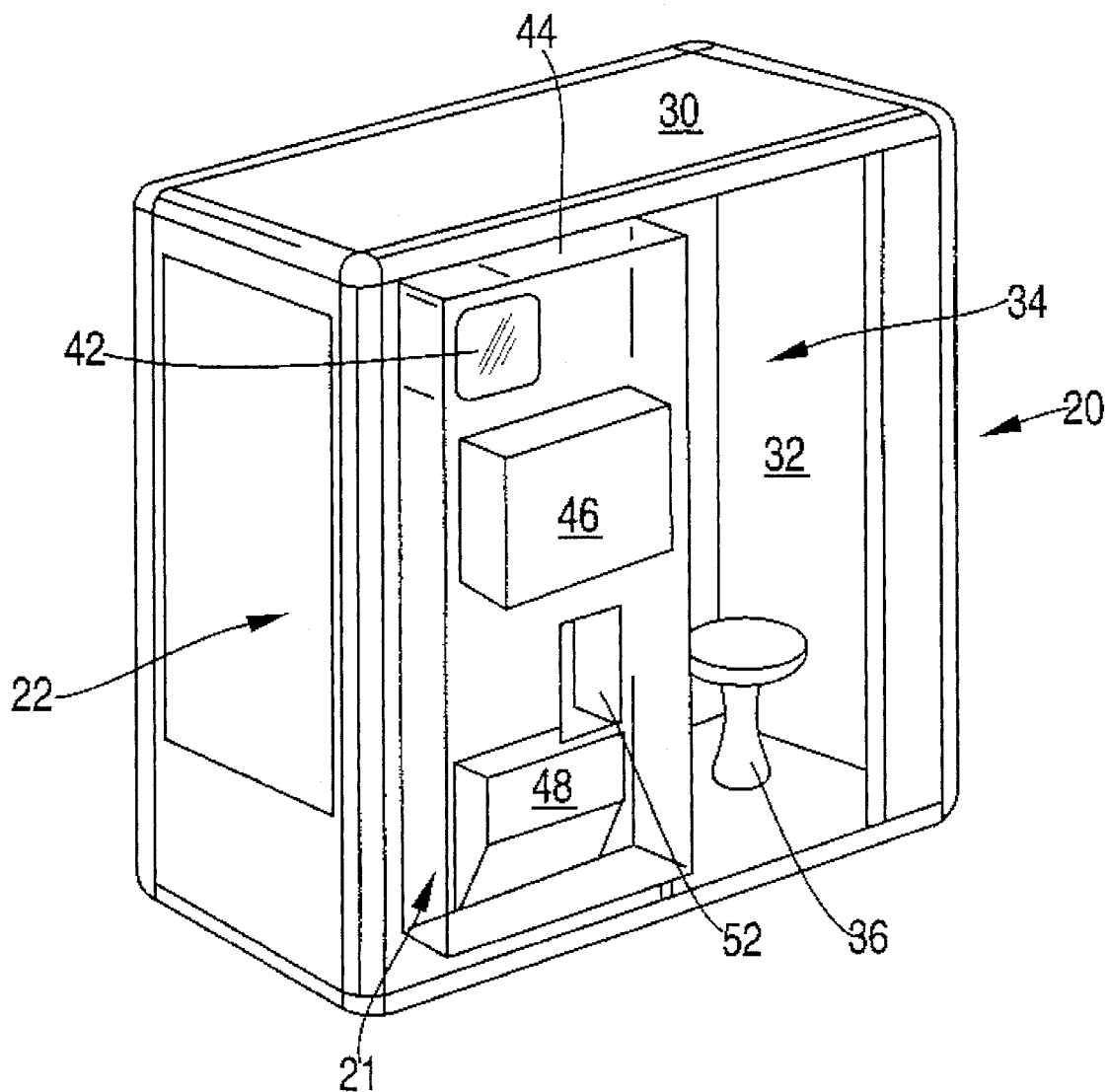
FIG. 3 is a diagrammatic view of a second embodiment.
Figure 5:
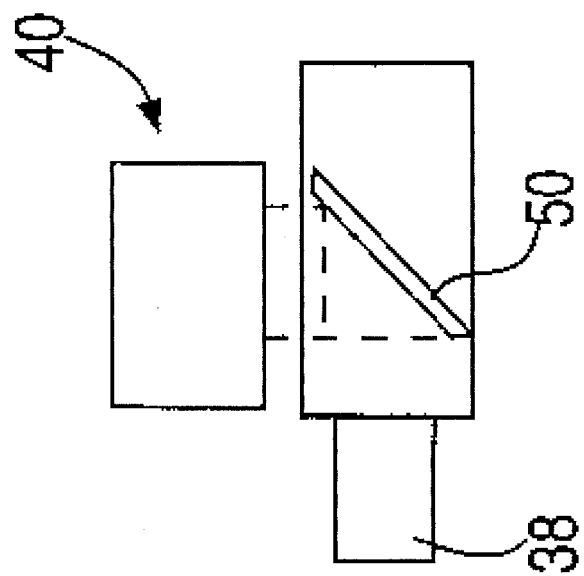
FIG. 5 is a side view corresponding to FIG. 4.
Figure 4:
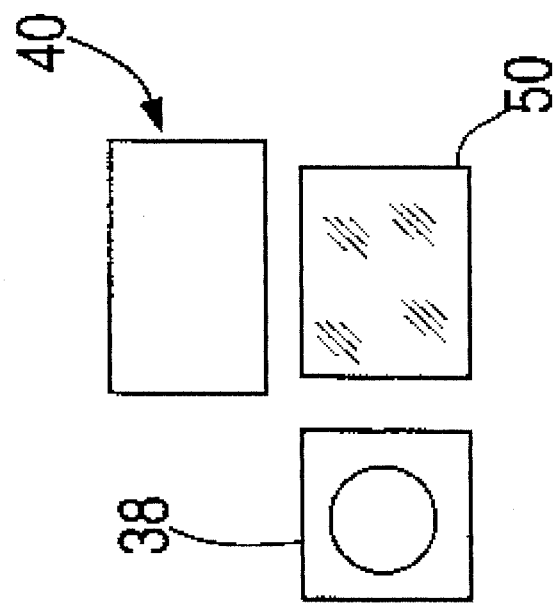
FIG. 4 is a front elevation of a detail of the second embodiment.

Referring now to FIGS. 3, 4 and 5 there is shown a photographic self portrait installation 20 according to the second aspect of the invention including a video-photo installation 21 integrated with a self-photography installation 22 within a single booth 30 provided with an entry 32 leading to a photographic zone 34 in which is located a stool 36 for a user to seat himself/herself in front of a video camera 38 (FIGS. 4 and 5) disposed at an appropriate height within the booth but not shown in FIG. 3. Selector means (not shown) are provided within the booth for the user to select which of the integrated installations is desired to be used, the camera being common to both.

The video-photo installation 21 is essentially the same as that described in relation to FIG. 1 save that within the booth 30 a single monitor screen 40 is provided, a further monitor screen 42 being provided exteriorly of the booth 30 as shown to replicate the images shown on the monitor screen 40. The monitor screen 42 is sited in a casing 44 mounted on the side of the booth 30, the casing also enclosing a computer 46, a keyboard 48 therefor, and a printer (not shown) for printing the image generated by the video-photo installation 22. The video camera 38 is located adjacent the monitor screen 40 which faces downwardly to project its image onto an angularly orientated mirror 50 disposed in side by side relation to the camera, a user seated on the stool 36 being able to look into the camera and to view the reflected image of the monitor screen 40. The user is thereby enabled to view the video image as a true mirror image which will be the background to the foreground of the stored images which latter will be selected by the user in the same manner as described in relation to FIG. 1.

If the user wishes to have a conventional self photograph taken, the selector means is operated appropriately and the user poses in front of the video camera which also takes the photograph to be developed by the conventional wet photography process of installation 22, the resulting photographs being delivered at 52.

The second embodiment of the present invention allows a photographic self portrait installation to perform a dual function, the one providing the user with a 'fun' photograph such as that depicted in FIG. 2, or in the alternative the other providing images of the user alone in the same or different poses.

Figure 6:
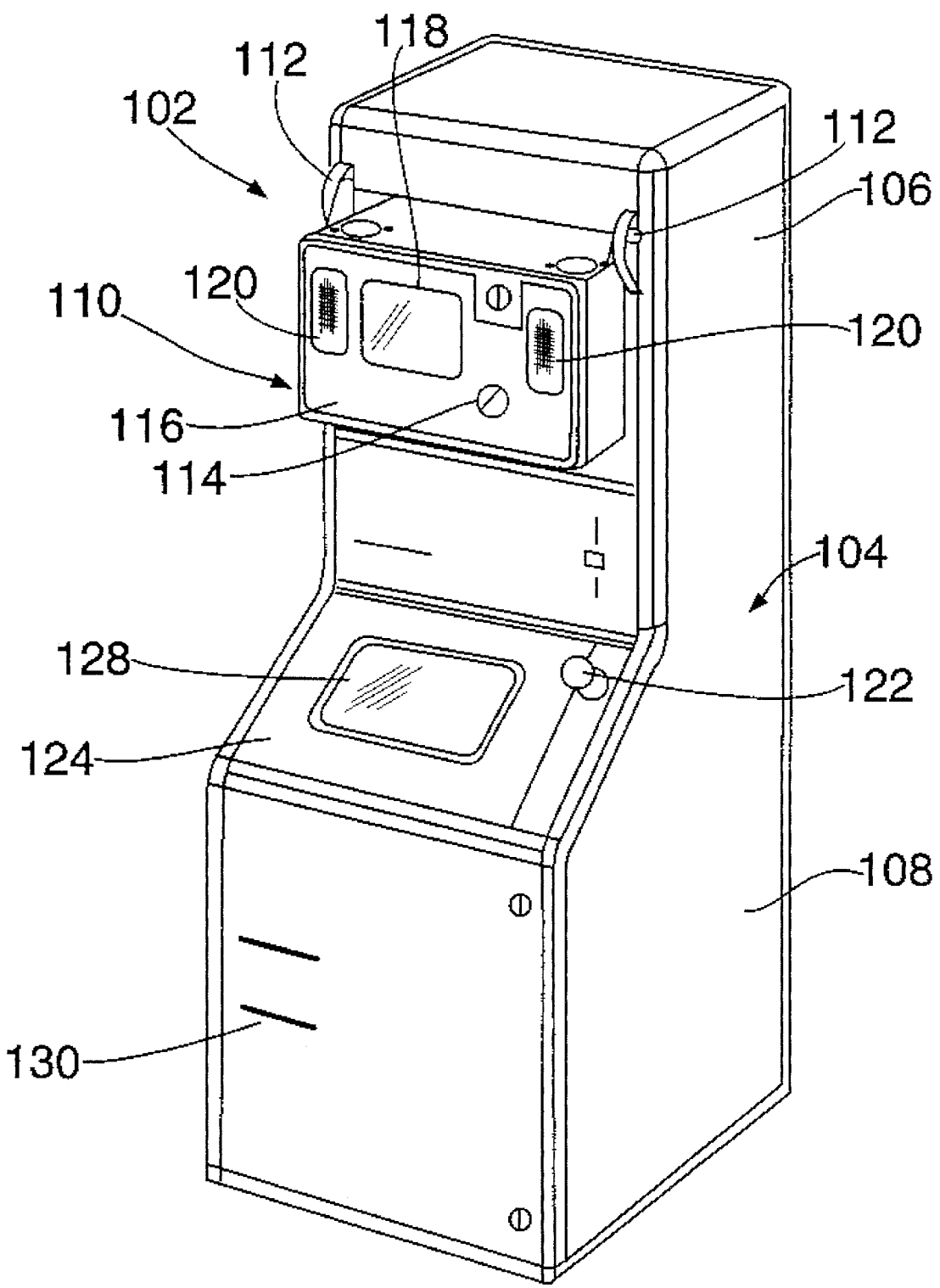
FIG. 6 is a perspective view of a third embodiment.

Referring now to FIG. 6, there is shown a third embodiment of photographic self portrait installation which is free standing and open, namely without a booth. The installation is shown at 102 and comprises a cabinet 104 having an upper part 106 and a lower part 108. The cabinet 104 contains the requisite components as hereinbefore described, inter alia the computer, for example a programmable logic controller, for controlling the operation of the installation, the memory storing a plurality of preselected computer-digitised images and messages.

A housing 110 is pivotally attached to the upper part 106 at 112 and contains a video camera (not shown) having a lens registering with a window 114 in the face 116 of the housing. The housing 110 also has mounted therein a video monitor having a screen 118 and lighting in the form of two lamps 120 one at each marginal portion of the face 116 of the housing. The pivotal movement of the housing 110 is controlled by a mechanism (not shown) by instruction from a subject user of the installation through the agency of a joy stick 122 disposed in an inclined face 124 of the lower part 108 in which is mounted the screen 128 of a further video monitor.

The installation 102 is provided with a currency or card operating mechanism (not shown) which upon insertion of the valid currency, which may be coinage or notes, or of the card will initiate operation of the installation.

In operation, a subject user wishing to use the installation to produce a personalised photographic montage initiates operation of the installation by insertion of the correct currency. Instructions as to the various steps to be taken during the session will then appear on the screen 128. In the first instance the video camera requires to be targetted upon the subject user who will be standing in front of the installation. For this purpose the joy stick 122 is moved in order to pivot the housing 110 in the appropriate direction until the user's real time image appears properly within the frame of the screen 118. The screen 128 will then instruct the subject user to choose a message from a list of messages which will appear thereon. In addition to the visual instructions, confirmatory audible instructions are also given to the subject user by the use of a loudspeaker (not shown). The screen 128 may be a touch screen, or buttons may be provided on the lower part of the casing 110 to provided the user with the means for choosing a message. Once the message is initially chosen, the screen will ask the user to confirm the choice. In an alternative embodiment, a keyboard is provided and the user can input a personal message. Once the message has been confirmed, another instruction will appear on the screen 128 inviting the user to select one of the preselected images stored in the memory, the images appearing on the screen either as a montage or in sequence. The chosen image appears also on screen 118 together with the user's image in real time. The user in accordance with instructions given by the screen and audibly will have to confirm his choice of image. The user then poses and within a given time frame, indicated by gradually extinguishing lights, or the illumination of a warning light, a picture capturing the montage of the message, the stored preselected and chosen image, together with a frozen image of the user, appears on the lower screen.

A message will then appear on the lower screen enquiring of the user as to whether the montage is acceptable and whether a re-pose of the user's image is required. Assuming the montage is acceptable and the user confirms acceptability by touching the screen in an appropriate manner or presses the correct confirmatory button, a print will be made of the montage. The photographic print is delivered at a discharge point 130 in the casing.

It is to be understood that the user has a choice at each stage and can re-input a different choice, subject to an inbuilt time limitation, and even at the final stage, the user can reposition the camera lens by using the joystick and can re-pose before the montage is printed. At the end of each stage of the operation of the installation, the subject user has to confirm his first choice within that stage before the next stage is initiated.

Figure 7:
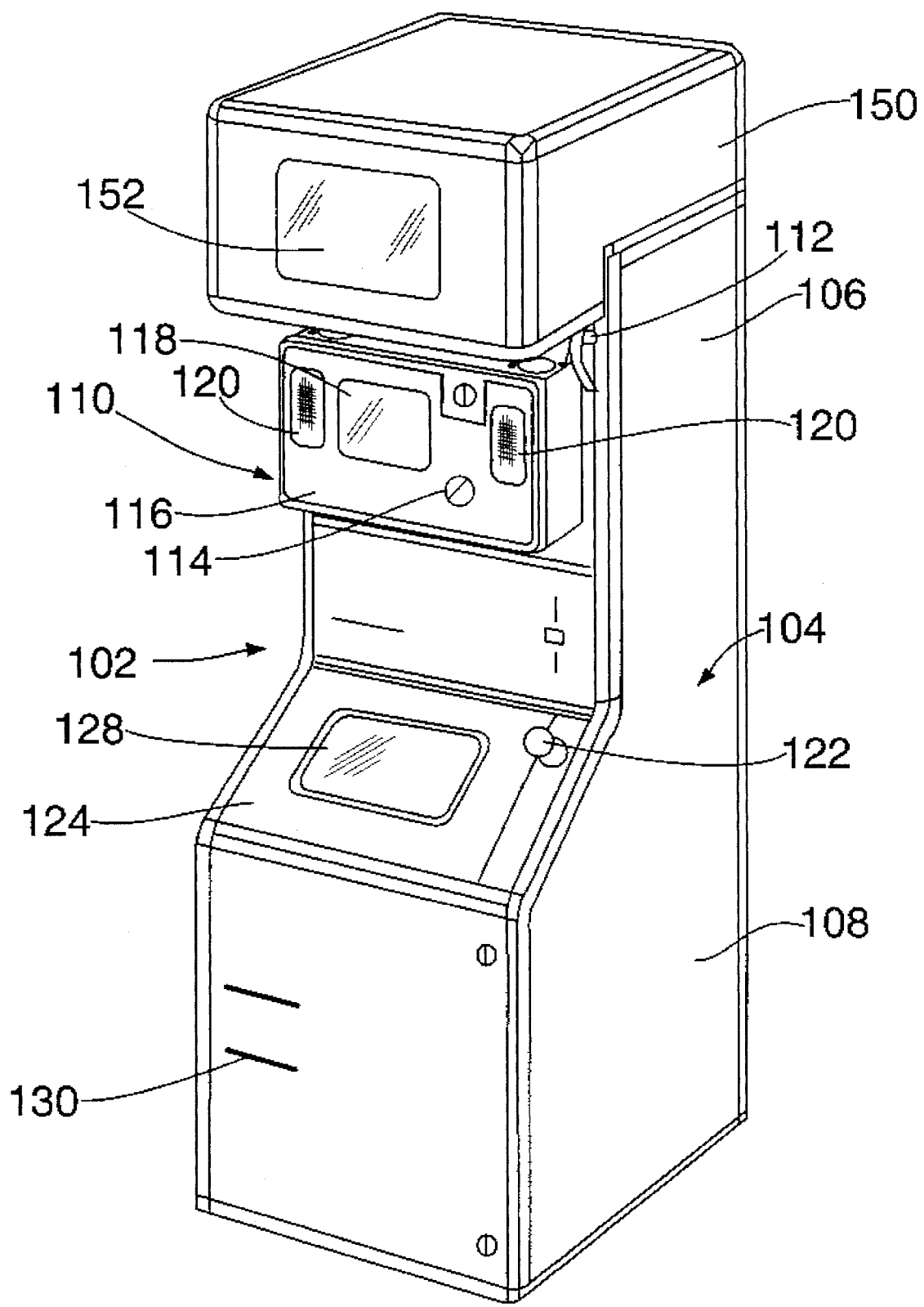
FIG. 7 is a perspective view of a fourth embodiment.

Referring now to FIG. 7, there is shown a similar installation to that illustrated in FIG. 6. In this embodiment, a further casing 150 is mounted on top of the cabinet 104 and incorporates a third video monitor 152 which interfaces with the computer and can project any desired picture. For example, the screen may project a continuous sequential show of the stored images when the installation is not is use, as an advertising aid. When the installation is in use, the third monitor may show exactly the same picture as seen on the monitor 118 to provide a focus for the attention of bystanders to encourage interest. In the alternative, the screen may project any desired picture within the capability of the computer.

The installations of both FIGS. 6 and 7 may be provided with a further monitor (not shown) at a location remote therefrom for observation by an operator who could view a potential customer of the installation. A loudspeaker would be provided on the installation and the operator would be provided with a microphone for speaking to the customer with a view to encouraging use of the installation. The loudspeaker could be the same as that employed for providing audible instructions to the subject user during use of the installation.

It is to be understood that the term computer herein is deemed to include but not be limited to a programmable logic controller or any equivalent thereof.

We claim:

1. A photographic self-portrait installation comprising a video-photo installation including a video camera for viewing a subject user, characterised by a first monitor for reproducing a real time image of the user as a background on the monitor screen, a computer for controlling the operation of the installation, a memory store of preselected computer-digitised images, means for storing a frozen real time image, interface means for interfacing the memory store with the real time image for display on the first monitor and/or for interfacing with the frozen real time image, means for creating a frozen real time image, means for selecting a computer-digitised image, a second monitor for displaying a composite of a user-created frozen real time image as a background and at least one user-selected computer-digitised image from the memory store as a foreground, and a printer for printing the said composite upon user command.

2. An installation according to claim 1 characterised in that a video enhancer is employed between the video camera and the interface means to enhance the colour and lighting characteristics.

3. An installation according to claim 1 characterised in that means are provided to give the subject user a visual indication of when the image is to be frozen.

4. An installation according to claim 1 characterised by a booth housing the installation in which the user can be seated for the video-photo session.

5. An installation according to claim 1 characterised in that the second monitor is a touch screen for enabling the user to instruct the installation.

6. An installation according to claim 1 characterised in that the printer is adapted to produce a diskette on which the composite is recorded.

7. An installation according to claim 1 characterised in that a third monitor is provided.

8. An installation according to claim 7 characterised in that the third monitor is adapted to give a mirror image of the background and the foreground, but showing the composite in real time.

9. An installation according to claim 1 characterised in that the memory of computer-digitised images comprises a variety of foreground images.

10. An installation according to claim 9 characterised in that the computer-digitised images are of personalities, places, post cards, greeting cards, or identity cards.

11. An installation according to claim 1 characterised in that the camera is orientable by actuation means provided for the user.

12. An installation according to claim 11 characterised in that the actuation means is manual.

13. An installation according to claim 11 characterised in that the actuation means is electrically controlled with motors arranged to change the position of the camera.

14. An installation according to claim 1 characterised in that the computer is so programmed that the memory store of computer-digitized images is continuously and sequentially displayed as a superimposed foreground on the real time image of the subject user, the interface means effecting the composite.

15. An installation according to claim 14 characterised in that the continuous display of the computer-digitised images can be stopped with a command from the user at the selected choice.

16. An installation according to claim 14 characterised in that a third monitor is provided to display the computer-digitised images continuously and sequentially.

17. An installation according to claim 1 characterised in that the installation is open without any enclosure for the subject-user, the installation being adapted to capture the image of the subject-user in a standing position and to display the images publicly.

18. An installation according to claim 17 characterised in that the installation has a link with a remote location for an operator and is provided with a further monitor adapted to project a real time image of the subject user, the installation being provided with a loudspeaker connected to a microphone whereby in use an operator at the remote location is able to communicate with the subject user.

19. An installation according to claim 17 characterised by the camera being orientable by actuation means provided for the user; and an upstanding cabinet having an upper part on which is pivotally mounted a casing housing the camera and the first monitor, and having a lower part housing at least the second monitor and the actuation means for altering the orientation of the camera.

20. An installation according to claim 19 characterised in that the second screen is adapted to display menus of choice for the user and to depict the selected choice thereon.

21. An installation according to claim 19 characterised in that a third monitor is provided to display computer-digitised images continuously and sequentially, the computer being so programmed that the memory store of computer-digitised images is continuously and sequentially displayed as a superimposed foreground on the real time image of the subject user, the interface means effecting the composite; and in that a further casing is mounted on top of the cabinet and incorporates the third monitor.

22. An installation according to claim 17 characterised in that the actuation means is manual; and that the installation has an upstanding cabinet having an upper part on which is pivotally mounted a casing housing the camera and the first monitor, and having a lower part housing at least the second monitor and the actuation means for altering the orientation of the camera.

23. An installation according to claim 22 characterised in that the second screen is adapted to display menus of choice for the user and to depict the selected choice thereon.

24. An installation according to claim 22 characterised in that a third monitor is provided to display computer-digitised images continuously and sequentially, the computer being so programmed that the memory store of computer-digitised images is continuously and sequentially displayed as a superimposed foreground on the real time image of the subject user, the interface means effecting the composite; and in that a further casing is mounted on top of the cabinet and incorporates the third monitor.

25. A photographic self-portrait installation comprising a video-photo installation including a video camera for viewing a subject user, characterised by a monitor screen for reproducing a real time image of the user as a background on the monitor screen, a computer for controlling the operation of the video-photo installation, a memory store of preselected computer-digitised images, means for storing a frozen real time image, interface means for interfacing the memory store with the real time image for display on the monitor screen and/or for interfacing with the frozen real time image, means for creating a frozen real time image, means for selecting a computer-digitised image, the monitor displaying a composite of a user-created frozen real time image as a background and at least one user-selected computer-digitised image from the memory store as a foreground, a first printer for printing the said composite upon user command, and including a self-photography installation adapted to utilise the said video camera for taking self portraits of a user, and a second printer employing a wet photographic process, and selector means for selecting the video-photo installation or the self-photography installation to produce the required self portrait.

26. An installation according to claim 25 characterised in that the video camera in the second aspect is disposed adjacent the monitor.

27. An installation according to claim 25 characterised in that the monitor is of the liquid crystal type.

28. An installation according to claim 25 characterised in that the monitor screen is orientated in a horizontal plane downwardly to project any image thereon onto a mirror suitably angularly orientated to give a reflected image to a user placed in front of the camera.

29. An installation according to claim 25 characterised in that the second printer employs a conventional wet photographic development process.

30. An installation according to claim 25 characterised by a booth housing the installation.

* * * * *